(12) United States Patent
Payton

(10) Patent No.: US 7,181,076 B1
(45) Date of Patent: Feb. 20, 2007

(54) WAVELET-BASED DATA COMPRESSION USING PRINCIPAL COMPONENTS TRANSFORMATION

(75) Inventor: Paul M. Payton, Burlingame, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 8 days.

(21) Appl. No.: 10/964,640

(22) Filed: Oct. 15, 2004

Related U.S. Application Data

(63) Continuation-in-part of application No. 10/870,422, filed on Jun. 18, 2004, which is a continuation of application No. 09/625,859, filed on Jul. 26, 2000, now Pat. No. 6,754,383.

(51) Int. Cl.
*G06K 9/46* (2006.01)
*G06K 9/00* (2006.01)

(52) U.S. Cl. ........................ 382/240

(58) Field of Classification Search ............... 382/162, 382/166, 232, 233, 240, 244, 250, 251, 305; 358/523, 525; 345/600–604, 619; 348/224.1, 348/333.03; 375/240.03, 240.19, 240.21, 375/240.26
See application file for complete search history.

(56) References Cited

U.S. PATENT DOCUMENTS

| | | |
|---|---|---|
| 5,014,198 A | 5/1991 | Umemura |
| 5,196,946 A | 3/1993 | Balkanski et al. |
| 5,253,078 A | 10/1993 | Balkanski et al. |
| 5,422,736 A | 6/1995 | Katayama |
| 5,465,164 A | 11/1995 | Sugiura et al. |
| 5,680,129 A | 10/1997 | Weinberger et al. |
| 5,798,753 A * | 8/1998 | Zhou et al. .......... 345/603 |
| 5,982,432 A | 11/1999 | Uenoyama et al. |
| 6,049,775 A | 4/2000 | Gertner et al. |
| 6,125,201 A | 9/2000 | Zador |
| 6,157,734 A * | 12/2000 | Iida ...................... 382/162 |
| 6,195,466 B1 | 2/2001 | Schwartz et al. |
| 6,236,749 B1 | 5/2001 | Satonaka et al. |
| 6,259,741 B1 * | 7/2001 | Chen et al. .......... 375/240.26 |
| 6,266,440 B1 | 7/2001 | Oneda |
| 6,308,193 B1 | 10/2001 | Jang et al. |
| 6,404,928 B1 | 6/2002 | Shaw et al. |
| 6,427,029 B1 | 7/2002 | Kono et al. |
| 6,453,072 B1 | 9/2002 | Hatakenaka |
| 6,453,073 B2 | 9/2002 | Johnson |

(Continued)

OTHER PUBLICATIONS

"Coding of Still Pictures: JPEG 2000 Requirements and Profiles Version 6.3", presented to WG1 Aries Meeting, WG1 Web pages, Hewlett-Packard Company, ISO/IECJTC 1/SC 29/WG 1 N1803, Jul. 2000 (41 pages).

(Continued)

*Primary Examiner*—Amir Alavi
(74) *Attorney, Agent, or Firm*—McDermott Will & Emery LLP

(57) ABSTRACT

A method for compressing and reconstructing a color image using principal components transformation. Color image information for a color image is received, and the color image information is converted into intrinsic color information. The intrinsic color information is transformed into transformed information using the JPEG 2000 discrete wavelet transform ("DWT") algorithm, and the transformed information is quantized into quantized information. The quantized information is encoded into encoded information, and stored. In an additional arrangement, the encoded information is reconstructed using non-pixel data.

40 Claims, 9 Drawing Sheets

U.S. PATENT DOCUMENTS

| | | | |
|---|---|---|---|
| 6,584,232 B2* | 6/2003 | Kobayashi | 382/251 |
| 6,665,446 B1* | 12/2003 | Kato | 382/251 |
| 6,754,383 B1 | 6/2004 | Payton | |
| 6,832,006 B2 | 12/2004 | Savakis et al. | |
| 6,868,190 B1 | 3/2005 | Morton | |
| 6,891,975 B2* | 5/2005 | Okada | 382/243 |
| 6,917,384 B1* | 7/2005 | Fukushima | 348/333.03 |
| 2003/0016233 A1 | 1/2003 | Charpentier | |
| 2003/0174896 A1 | 9/2003 | Ridge | |
| 2004/0212692 A1 | 10/2004 | Nakami et al. | |
| 2004/0258301 A1 | 12/2004 | Payton | |

OTHER PUBLICATIONS

"Coding of Still Pictures: An Analytical Study of JPEG 2000 Functionalities", to be published in the Proceedings of SPIE, vol. 4115 of the 45 Annual SPIE Meeting, Hewlett-Packard Company, ISO/IECJTC 1/SC 29/WG 1 N1816, Jul. 2000 (11 pages).

Martin Boliek, et al., "Coding of Still Pictures: JPEG 2000 Part I Final Committee Draft Version 1.0", presented to WG1, Hewlett-Packard Company, ISO/IECJTC 1/SC 29/WG 1 N1646R, Mar. 16, 2000 (202 pages).

"Image Data Compression: CCSDS Recommendation for Space Data System Standards", Consultative Committee for Space Data Systems, CCSDS 122.0-R-1, Red Book, Jun. 2003 (45 pages).

"The JPEG 2000 Still Image Coding System: An Overview", IEEE Transactions on Consumer Electronics, vol. 46, No. 4, pp. 1103-1127, Nov. 2000.

European Search Report dated Mar. 18, 2005, in EP 01850124.7.

"Three-Dimensional Transform Coding of Multispectral Data", by John A. Saghri, et al., 1993 IEEE, pp. 1342-1346.

"Terrain-Adaptive Transform Coding Of Multispectral Data", by John A Saghri, et al., 1994 IEEE, pp. 313-316.

"Coding Of Spectrally Homogenous Regions In Multispectral Image Compression", by Gabriel Fernandez, et al., 1996 IEEE, pp. 923-926.

"An Efficient Adaptive KLT For Multispectral Image Compression", by Lena Chang, et al., 2000 IEEE, pp. 252-255.

* cited by examiner $$|r'*r' \quad r'*g' \quad r'*b'|  \qquad r'=r-m_r$$
$$|g'*r' \quad g'*g' \quad g'*b'|  \qquad g'=g-m_g$$
$$|b'*r' \quad b'*g' \quad b'*b'|  \qquad b'=b-m_b$$

WAVELET-BASED DATA COMPRESSION USING PRINCIPAL COMPONENTS TRANSFORMATION

CROSS-REFERENCE

This application is a continuation-in-part application of U.S. patent application Ser. No. 10/870,422, filed Jun. 18, 2004, which is a continuation of U.S. patent application Ser. No. 09/625,859, filed Jul. 26, 2000 (issued as U.S. Pat. No. 6,754,383 on Jun. 22, 2004), both of which are incorporated herein for all purposes.

STATEMENT AS TO RIGHTS TO INVENTIONS MADE UNDER FEDERALLY SPONSORED RESEARCH OR DEVELOPMENT

Not Applicable.

FIELD OF INVENTION

The present invention relates to true color image compression and reconstruction. More particularly, the present invention relates to lossy compression and reconstruction using an image specific discrete wavelet transformation.

BACKGROUND OF THE INVENTION

JPEG (pronounced "jay-peg") is a standardized image compression mechanism for still images. JPEG, which stands for "Joint Photographic Experts Group" (the original name of the committee that wrote the standard), is designed for compressing either full-color or gray-scale images of natural, real-world scenes. JPEG typically works well on photographs, naturalistic artwork, and similar material, but is not as effective on lettering, simple cartoons, or line drawings.

JPEG 2000 is an improved standardized image compression mechanism derived from the JPEG algorithm, which provides higher performance and improved functionality over conventional JPEG. As a result of the increasing complexity of digital imagery, JPEG 2000 was developed to better manipulate ever-increasing amounts of data, reducing the necessary storage and bandwidth requirements for associated hardware, and allowing extraction for editing, processing, and targeting of particular devices and applications. In addition to the rate-distortion advantage over conventional JPEG, JPEG 2000 allows for the extraction of different resolutions, pixel fidelities, regions of interest, components, and more, all from a single compressed bitstream.

The conventional JPEG and JPEG 2000 image compression mechanisms are "lossy," which means that a decompressed image is not exactly the same as the image which was originally compressed, although JPEG and JPEG 2000 are designed to exploit known limitations of the human perception. Lossy compression mechanisms are able to achieve a much greater compression ratio than conventional lossless methods. Since conventional lossy image compression mechanisms are intended for compressing images that will be looked at by humans, they typically rely on the fact that small color changes are perceived less accurately than small changes in brightness. As such, the small errors introduced by conventional JPEG and JPEG 2000 may create problems for images intended to be machine-analyzed.

One useful property of both conventional JPEG and JPEG 2000 is that the compression parameters can be adjusted to vary the degree of lossy-ness. In this regard, an image-maker can trade off file size against output image quality, making extremely small files with poor quality, for indexing image archives. Conversely, an image maker can increase the output image quality, albeit with lesser data compression.

The conventional JPEG compression algorithm may be implemented in both software and hardware. For example, C-Cubed Corporation introduced the first JPEG chip for compressing digital video images, which provides the requisite speed for real-time compression. JPEG++, an algorithm described in U.S. Pat. No. 5,014,198, developed by Storm Technology, is an extension to JPEG. JPEG++allows selected picture areas to be compressed at different ratios depending on the significance of the visual impact to the area in the image.

Conventional JPEG compression uses an encoding technique called discrete cosine transformation ("DCT"). DCT is a technique for representing waveform data as a weighted sum of cosines, resulting in lossy compression. DCT itself does not lose data; rather the data compression technologies that rely on DCT approximate some of the coefficients to reduce the amount of data.

Unlike JPEG, conventional JPEG 2000 compression uses an encoding technique known as a discrete wavelet transformation ("DWT"). The DWT is designed to decorrelate an image, decomposing an image tile into several subbands, and transforming an image data signal into two or more decimated signals corresponding to different frequency bands. The subbands consist of coefficients that describe the horizontal and vertical spatial frequency characteristics of the original tile component. The DWT generally results in the signal energy being concentrated in a small number of subbands, and the subbands subsequently tend to compress more easily than the original image.

One problem with the traditional JPEG and JPEG 2000 algorithms is that they employ a fixed color space transformation prior to encoding with the DCT or DWT, respectively, a limitation which developed in the respective standards due to historical reasons relating to the cost of computation. This fixed color space transformation is employed to transform an image from an red-green-blue color space ("RGB color space") or a cyan-magenta-yellow color space ("CMY color space") or a cyan-magenta-yellow-black color space ("CMYK color space") into a luminance/chrominance color space (the "YUV color space," also known as the "YCC" or "YCrCb" color spaces), where luminance is the first component ("Y") and chrominance the second component ("U" or "Cb" chroma channel, or U-axis) and third component ("V" or "Cr" chroma channel, or V-axis).

To perform the transform a fixed predetermined matrix is employed to convert the image from a RGB color space, for example, into a luminance/chrominance color space represented in an unsigned byte form, such that each value is between 0 and 255. The rationale for using the luminance/chrominance color space is that some chrominance information can be lost in an image, since the human eye is less likely to perceive the changes in the chrominance or color component of a reconstructed image. As a result, the chrominance components are sub-sampled or reduced, while the luminance component is left at full resolution. This fixed color space transformation is not optimal, and leads to an inefficient use of channel-based compression techniques such as conventional JPEG or JPEG 2000.

In particular, the use of a predetermined matrix to execute the transformation does not ensure the most information is presented in the first component because it does not consider the wide variety of possible scene content in each compressed image. Since the transformation does not actively control or attempt to provide the most information about an individual image in the first component, all images are treated equally despite the errors that may occur when reconstructing a compressed image, affecting image perception. Accordingly, images or applications that have a lower tolerance for loss are compressed at lower ratios since more information in the second and third components is required. This results in larger files, and thus less file storage space. In addition, larger files require significantly more time to transmit from a host to a remote site than smaller files. As a result, a method is needed that provides optimal image compression to improve file storage capacity and transmission time, while reducing image quality degradation for a single image.

It is therefore considered highly desirable to provide an improved mechanism for compressing images which utilizes a DWT. In particular, it is desirable to provide an image compression mechanism which improves upon the fixed color space transformation used by conventional JPEG 2000, in order to generate smaller compressed image files.

SUMMARY OF THE INVENTION

The present invention relates to true color image compression and reconstruction. More particularly, the present invention relates to lossy compression and reconstruction using an image specific discrete wavelet transformation.

Based on the foregoing discussion, it can be appreciated that there presently exists a need in the art for a computer system and corresponding operating method which overcomes the above-described deficiencies of the prior art. The present invention overcomes several key drawbacks and shortcomings, particularly the fixed color space transformation used prior to channel encoding by conventional JPEG or JPEG 2000 image compression mechanisms, thereby remedying the deficiencies of conventional image compression techniques.

It is a feature and advantage of the present invention to provide an image compression and reconstruction technique that improves the image quality of a reconstructed image, by reducing image quality degradation at high compression ratios, and optimizing utilization of file space. As such, the present invention reduces transmission times required to transmit compressed images. It is a further feature and advantage of the invention to compress a color image, utilizing a transformation that differs for each image, and is dependent on color distribution statistics.

The present invention is a system, method, and computer program product for compression and reconstruction of a color image using principal components transformation. The method is performed on a computer or other programmable data processing apparatus. The method is performed as a variant of conventional JPEG or JPEG 2000 image compression techniques.

According to one aspect, the present invention is a method for compressing a color image. The method includes the steps of receiving color image information for a color image, converting the color image information into intrinsic color information, and transforming the intrinsic color information into transformed information using a discrete wavelet transform algorithm. The method further includes the steps of quantizing the transformed information into quantized information, encoding the quantized information into encoded information, and storing the encoded information.

The method for compressing a color image further includes the steps of generating non-pixel data associated with the color image, and storing the non-pixel data in association with the encoded information. The intrinsic color information represents the color image in a principal components space. The non-pixel data includes an eigenmatrix, scale factors, and a mean vector. The discrete wavelet transform algorithm is the JPEG 2000 discrete wavelet transform algorithm.

According to a second aspect, the present invention is a system for compressing a color image, including means for receiving color image information for a color image, means for converting the color image information into intrinsic color information, and means for transforming the intrinsic color information into transformed information using a discrete wavelet transform algorithm. The system further includes means for quantizing the transformed information into quantized information, means for encoding the quantized information into encoded information, and means for storing the encoded information.

The system further includes means for generating non-pixel data associated with the color image, and means for storing the non-pixel data in association with the encoded information.

According to a third aspect, the present invention is a computer-readable storage medium in which is stored a program for compressing a color image. The program includes codes for permitting the computer to perform a reception step for receiving color image information for a color image, a converting step for converting the color image information into intrinsic color information, and a transforming step for transforming the intrinsic color information into transformed information using a discrete wavelet transform algorithm. The program further includes codes for permitting the computer to perform a quantizing step for quantizing the transformed information into quantized information, an encoding step for encoding the quantized information into encoded information, and a storing step for storing the encoded information.

The program further includes codes for permitting the computer to perform a generating step for generating non-pixel data associated with the color image, and a storing step for storing the non-pixel data in association with the encoded information.

According to a fourth aspect, the present invention is a method for compressing and reconstructing a color image. The method includes the steps of receiving color image information for a color image, converting the color image information into intrinsic color information, and transforming the intrinsic color information into transformed information using a discrete wavelet transform algorithm. The method further includes the steps of quantizing the transformed information into quantized information, encoding the quantized information into encoded information, and reconstructing the encoded information using non-pixel data.

According to a fifth aspect, the present invention is a method for compressing and reconstructing a color image, including the steps of generating intrinsic color information for a color image, compressing the intrinsic color information using a JPEG 2000 discrete wavelet transform algorithm, and reconstructing the color image using non-pixel data.

With respect to the present invention, color image information for a color image is received, and the color image information is converted into intrinsic color information. The intrinsic color information is used to transform the color image into principal component space for use in the JPEG 2000 discrete wavelet transform algorithm.

The transformation is based on the color image's intrinsic color distribution, which is melded into the encoded bit stream of compressed imagery data and transmitted. The intrinsic color information characterizes the color image in a manner that increases the image quality, while reducing the size and transmission time of a compressed image file.

According to a sixth aspect, the present invention is a method for reconstructing a color image. The method includes the steps of receiving encoded information for the color image, decoding the encoded information into quantized information, and de-quantizing the quantized information into transformed information. The method further includes the steps of de-transforming the transformed information into intrinsic color information, using an inverse of a discrete wavelet transform algorithm, and de-converting the intrinsic color information into color image information.

The discrete wavelet transform algorithm is a JPEG 2000 discrete wavelet transform algorithm. The intrinsic color information represents the color image in a principal components space. The method further includes the step of retrieving non-pixel data associated with the color image, where the non-pixel data includes an eigenmatrix, scale factors, and a mean vector, and where the intrinsic color information is de-converted using the non-pixel data.

According to a seventh aspect, the present invention is a system for reconstructing a color image. The system includes means for receiving encoded information for the color image, means for decoding the encoded information into quantized information, and means for de-quantizing the quantized information into transformed information. The system further includes means for de-transforming the transformed information into intrinsic color information, using an inverse of a discrete wavelet transform algorithm, and means for de-converting the intrinsic color information into color image information.

According to an eighth aspect, the present invention is a computer-readable storage medium in which is stored a program for reconstructing a color image. The program includes codes for permitting the computer to perform a reception step for receiving encoded information for the color image, a decoding step for decoding the encoded information into quantized information, and a de-quantizing step for de-quantizing the quantized information into transformed information. The program further includes a de-transforming step for de-transforming the transformed information into intrinsic color information, using an inverse of a discrete wavelet transform algorithm, and a de-converting step for de-converting the intrinsic color information into color image information.

The present invention optimizes channel usage, resulting in less degradation in image quality while allowing greater compression ratios over conventional, fixed transformation techniques. The present invention is particularly relevant to JPEG 2000 and other wavelet-based compression techniques, since the range of compression ratios is extended, while image quality is maintained at compression ratios approaching 100:1.

In the following description of the preferred embodiment, reference is made to the accompanying drawings that form a part thereof, and in which is shown by way of illustration a specific embodiment in which the invention may be practiced. It is to be understood that other embodiments may be utilized and changes may be made without departing from the scope of the present invention.

BRIEF DESCRIPTION OF THE DRAWINGS

Referring now to the drawings in which like reference numbers represent corresponding parts throughout.

DETAILED DESCRIPTION OF THE INVENTION

Figure 1:
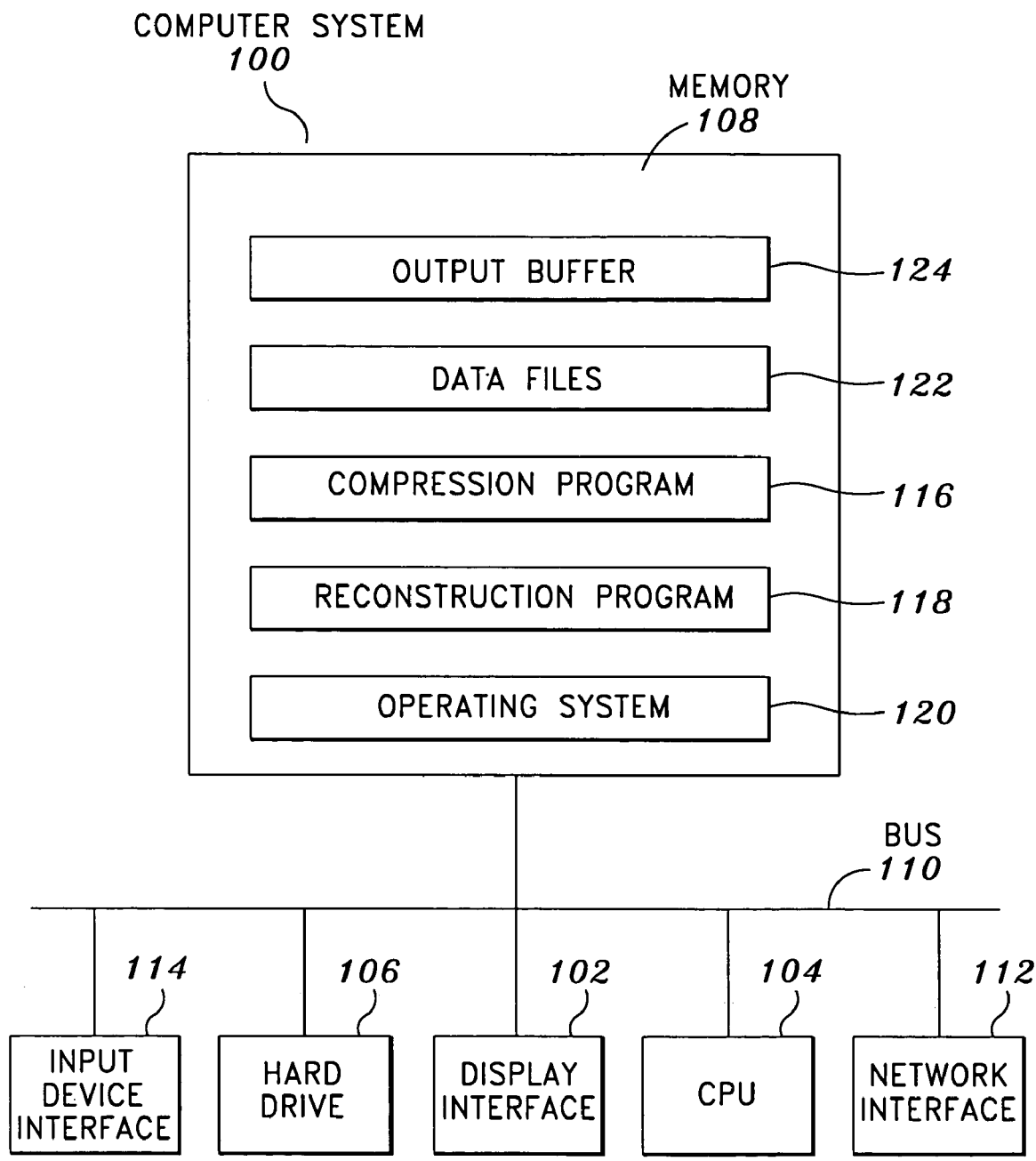
FIG. 1 is a functional block diagram of a computer in which the invention of the present invention can be carried out.

The present invention is now described more fully hereinafter with reference to the accompanying drawings that show preferred embodiments of the invention. This invention, however, may be embodied in many different forms and should not be construed as limited to the embodiments set forth herein. Appropriately, these embodiments are provided so that this disclosure will be thorough and complete, and will fully convey the scope of the invention. As will be appreciated by one having skill in the art, the present invention may be embodied as a method, data processing system, or computer program product. Accordingly, the present invention combines software and hardware to produce the embodiments described in further detail below. Furthermore, the present invention may take the form of a computer program product on a computer-readable storage medium having computer-readable program code means embodied in the medium. Any suitable computer-readable medium may be utilized including hard disks, CD-ROMs, floppy disks, optical storage devices, magnetic storage devices, etc.

The present invention is described below with reference to flowchart illustrations of methods, apparatus (systems) and computer program products according to the invention. It will be understood that each block of the flowchart illustrations, and combinations of blocks in the flowchart illustrations, can be implemented by computer program instructions. These computer program instructions may be loaded onto a general-purpose computer, special purpose computer, or other programmable data processing apparatus to produce a machine. These computer program instructions, which execute on the computer or other programmable data processing apparatus, create means for implementing the functions specified in the flowchart block or blocks. These computer program instructions may be stored in a computer-readable memory to direct a computer or other programmable data processing apparatus to function in a particular manner, producing an article of manufacture including instruction means which implement the function specified in the flowchart block or blocks. The computer program instructions may also be loaded onto a computer or other programmable data processing apparatus to cause a series of operational steps to be performed, producing a computer implemented process, such that the computer or other programmable apparatus provide steps for implementing the functions specified in the flowchart block or blocks. In one implementation, these computer program instructions are written in the C programming language. It is to be appreciated, however, that these routines may be implemented in any of a wide variety of programming languages.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

FIG. 1 is a block diagram of a computer system which implements the methods and computer program product in accordance with one embodiment of the present invention. Computer system 100 includes a display interface 102 for visually displaying information to a computer user, a central processing unit ("CPU") 104, hard drive 106, main memory 108, network interface 112, input device interface 114, and output buffer 124. As shown, the various components of computer system 100 communicate through a system bus 110 or similar architecture. Typically, CPU 104 is a microprocessor, such as an INTEL® PENTIUM® processor, but may also be any processor that executes program instructions in order to carry out the functions of the present invention. Input device interface 114 provides the capability to input data to computer system 100. For example, input device interface 114 may include a keyboard (not shown) or a mouse (not shown). Network interface 112 provides for data to be transmitted and received over a network.

Memory 108 stores data, such as compression routine 116, reconstruction routine 118, operating system 120, and a plurality of data files 122. Data files 122 can include, among other data, single image files, which can be processed according to the present invention. Compression processing routine 116 and reconstruction processing routine 118 are computer program instructions executed by CPU 104 that may be loaded into memory 108. The routines 116 and 118 implement the functions, as described in detail hereinafter, performed by the present invention. In addition, processing routines 116 and 118 may also be stored on computer readable media and used therefrom by computer system 100 to perform the specified functions or steps in accordance with the present invention. Operating system 120 provides overall system functionality. The output buffer 124 stores uncompressed image data for display on a display monitor.

In more detail, computer system 100 is a computing device such as a server, where computer system 100 includes computer-readable storage medium, such as hard drive 106, for compressing image data using the image compression mechanism according to the present invention. The hardware environment can include computer system 100, display monitor 102 for displaying text and images to a user, a keyboard for entering text data and user commands into computer system 100, a mouse for pointing, selecting and manipulating objects displayed on display monitor 102, hard drive 106, a removable disk drive, a tape drive, a hardcopy output device, a computer network, and network interface 112.

Computer system 100 can be a desktop PC, a laptop, a workstation, a midrange computer, or a mainframe without departing from the scope of the present invention. Display monitor 102 displays the graphics, images, and text that comprise the user interface for the application of the present invention as well as the operating system programs necessary to operate the computer. An operator of computer system 100 uses the keyboard to enter commands and data to operate and control the computer operating system programs as well as the application programs. The operator uses the mouse to select and manipulate graphics and text objects displayed on display monitor 102 as part of the interaction with and control of computer system 100 and applications running on the computer. The mouse can be any type of pointing device, including a joystick, a trackball, or a touch-pad without departing from the scope of the present invention.

The improved image compression mechanism application programs are stored locally on computer readable memory media such as hard drive 106. Hard drive 106 can comprise a number of physical drive units, such as a redundant array of independent disks ("RAID") without departing from the scope of the present invention. Hard drive 106 can also be a disk drive farm or a disk array that can be physically located in a separate computing unit without departing from the scope of the present invention. Such computer readable memory media allow computer system 100 to access information image data, image compression application data, computer-executable process steps, application programs and the like, stored on removable and non-removable memory media.

Network interface 112 can be a modem connection, a local-area network ("LAN") connection including the Ethernet, and a broadband wide-area network ("WAN") connection including digital subscriber line ("DSL"), Cable, T1, T3, Fiber Optics, and Satellite connection without departing from the scope of the present invention. The network can be a LAN network, a corporate WAN network, or the Internet without departing from the scope of the present invention.

The removable disk drive is a removable storage device that can be used to off-load data from computer system 100 or upload data onto computer system 100. Without departing from the scope of the present invention, the removable disk drive can be a floppy disk drive, an IOMEGA® ZIP® drive, a compact disk-read only memory ("CD-ROM") drive, a CD-Recordable drive ("CD-R"), a CD-Rewritable drive ("CD-RW"), a DVD-ROM drive, flash memory, a Universal Serial Bus ("USB") flash drive, pen drive, key drive, or any one of the various recordable or rewritable digital versatile disk ("DVD") drives such as the DVD-R, DVD-RW, DVD-RAM, DVD+R, or DVD+RW. Operating system programs, applications, and various data files are stored on disks. The files can be stored on hard drive 106 or on a removable media for the removable disk drive without departing from the scope of the present invention.

The tape drive is a tape storage device that can be used to off-load data from computer system 100 or upload data onto computer system 100. The tape drive can be quarter-inch cartridge ("QIC"), 4 mm digital audio tape ("DAT"), or 8 mm digital linear tape ("DLT") drive without departing from the scope of the present invention.

The hardcopy output device provides an output function for the operating system programs and applications including the improved image compression mechanism. The hardcopy output device can be a printer or any output device that produces tangible output objects, including image data or graphical representations of image data, without departing from the scope of the present invention. While the hardcopy output device is preferably directly connected to computer system 100, it need not be. The hardcopy output device may be connected via a network (e.g., wired or wireless network, not shown), for example.

The internal computing environment of computing system 100 can include: CPU 104 where the computer instructions that comprise an operating system or an application, including the improved image compression mechanism, are processed; a display interface 102 which provides communication interface and processing functions for rendering graphics, images, and texts on the display monitor; a keyboard interface which provides a communication interface to the keyboard; a pointing device interface which provides a communication interface to the mouse or an equivalent pointing device; a printer interface which provides a communication interface to the hardcopy output device; main memory 108 where computer instructions and data can be stored in a volatile memory device for processing by CPU 104; read-only memory ("ROM") where invariant low-level systems code or data for basic system functions such as basic input and output ("I/O"), startup, or reception of keystrokes from the CPU 104 are stored in a non-volatile memory device; a disk which can comprise hard drive 106 and the removable disk drive, where the files that comprise the operating system, application programs (including the improved image compression mechanism and other applications) and data files are stored; a modem interface which provides a communication interface to the computer network over a modem connection; and a computer network interface which provides a communication interface to network interface computer network 112 over a computer network connection. The constituent devices and CPU 104 communicate with each other over system bus 110.

Main memory 108 interfaces with system bus 110 so as to provide quick RAM storage to CPU 104 during execution of software programs such as the operating system application programs, and device drivers. More specifically, CPU 104 loads computer-executable process steps from hard drive 106 or other memory media into a region of main memory 108 in order to execute software programs. Data, including data relating to image compression, can be stored in main memory 108, where the data can be accessed by CPU 104 during execution.

The disk stores computer-executable code for a windowing operating system, application programs such as word processing, spreadsheet, presentation, graphics, image processing, gaming, etc. applications. The disk also stores the improved image compression mechanism. The improved compression of images according to the present invention is preferably implemented as shown, however it is also possible to implement the session manager according to the invention as a dynamic link library ("DLL"), or as a plug-in to other application programs such as an Internet web-browser such as the MICROSOFT® Internet Explorer web browser.

CPU 104 can be any of the high-performance CPUs, including an INTEL® CPU, a POWERPC® CPU, a MIPS® RISC CPU, a SPARC® CPU, an HP ALPHASERVER® CPU or a proprietary CPU for a mainframe, without departing from the scope of the present invention. CPU 104 in computer system 100 can comprise more than one processing unit, including a multiple CPU configuration found in high-performance workstations and servers, or a multiple scalable processing unit found in mainframes.

The operating system can be: MICROSOFT® WINDOWS NT®/WINDOWS® 2000/WINDOWS® XP Workstation; WINDOWS NT®/WINDOWS® 2000/WINDOWS® XP Server; a variety of UNIX®-flavored operating systems, including AIX® for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPENVMS® for HP ALPHASERVER®-based computers, MAC OS® X for POWERPC® based workstations and servers; or a proprietary operating system for mainframe computers.

While the preferred embodiment is implemented on a computer system that executes program code, or program or process steps, and is configured to compress images according to the present invention, one having ordinary skill in the art will recognize that the methods and computer program product in accordance with the present invention can be implemented on any system provided with a central processing unit, input/output circuitry, and a memory, such as a digital camera and the like. Other types of computing systems may also be used as well.

Figure 2A:
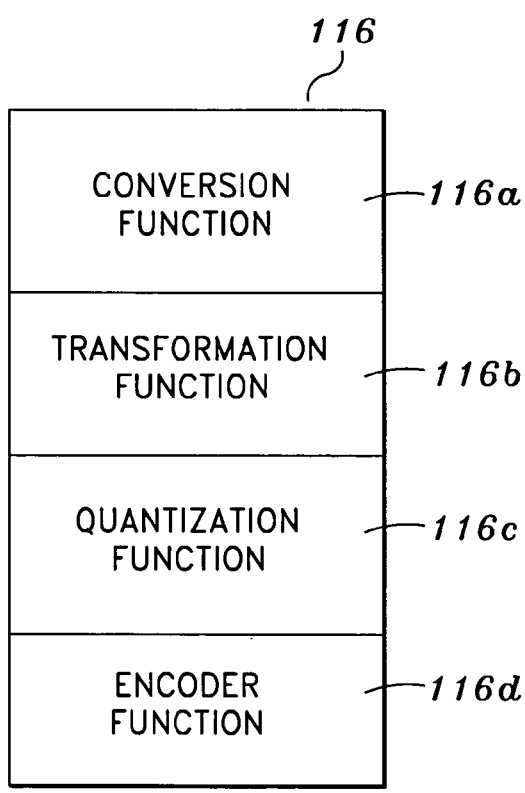
FIGS. 2A and 2B depict block diagrams of the routines that implement the method of the present invention.
Figure 2B:
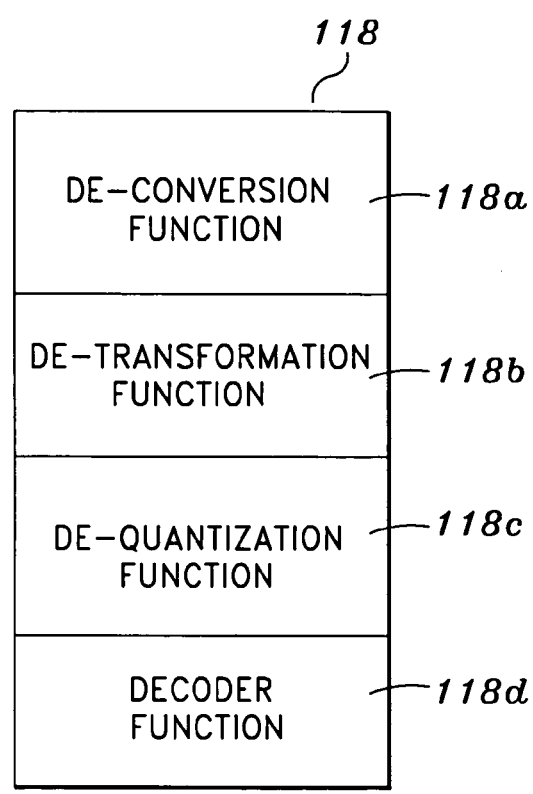

FIG. 2A depicts a more detailed view of the functions implementing the compression routine 116. The compression routine includes a conversion function 116a, a transformation function 116b, a quantizer function 116c, and an encoder function 116d. FIG. 2B illustrates the functions implementing the reconstruction routine 118. Reconstruction routine includes a de-conversion function 118a, a de-transformation function 118b, a de-quantizer function 118c, and a decoder function 118d. As will be described in detail below the present invention enables the computer system, under the direction of routines 116a to 116d and 118a to 118d to compress and reconstruct color images with less loss of image quality, respectively.

Figure 3:
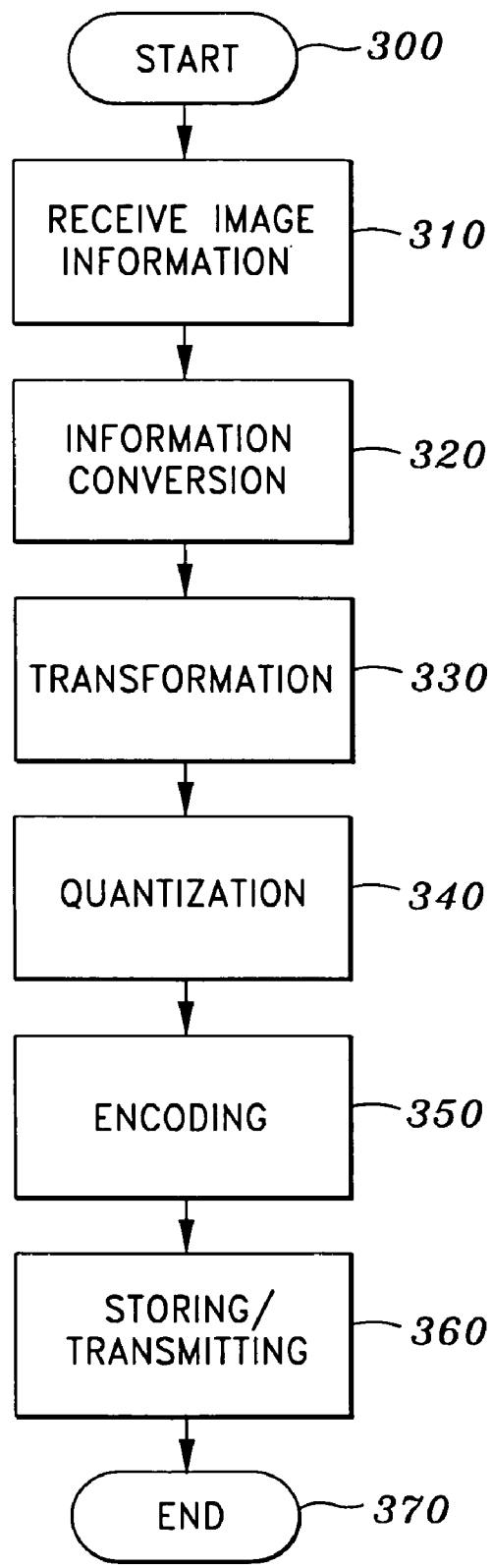
FIG. 3 is a flow diagram of the method performed in the computer of FIG. 1, in accordance with the present invention.

FIG. 3 depicts the process for compressing a color image as a block diagram. As mentioned above, the color image can represent a single image. Briefly, the method for compressing a color image includes the steps of receiving color image information for a color image, converting the color image information into intrinsic color information, and transforming the intrinsic color information into transformed information using a discrete wavelet transform algorithm. The method further includes the steps of quantizing the transformed information into quantized information, encoding the quantized information into encoded information, and storing the encoded information.

In more detail, the compression process begins (Step 300), and input image information is received corresponding to a color image obtained and designated for compression (Step 310). For example, the obtained color image can be one of a scanned raster image, a photograph from a digital camera, or a satellite image, such as SPACE IMAGING®'s IKONOS®, CNES/France's SPOT and the United States' LANDSAT®. The image can be obtained and designated in many forms, such as a user-initiated download. The input image information includes a plurality of numerical value sets representing the obtained color image in one of a plurality of normal color space signal formats. A normal color space signal format is a set of three numerical values which characterizes an image's colors in a particular color system using spectral weighting functions.

The obtained color image is represented in the RGB, CMY, or CMYK color space signal format, where a set of three numerical values (if RGB or CMY) or four numerical values (if CMYK) of the plurality of numerical value sets is associated with each pixel in the array of pixels for the obtained color image. In particular, this set of values in the normal color space signal format is expressed as a color triple or quadruple, such as (0,0,0) in the RGB color space, where each numerical value in the set corresponds to a color component used by the color system, and where the color components are used in combination by the particular color system to represent colors.

By varying the numerical values in a set of values in the color triple or quadruple, the representative color of the associated pixel varies. For example, the set of three numerical values or color triple $0_R, 0_G, 0_B$ represents the color black, where the numerical values correspond respectively to the red, green, and blue components for generating the color black in the RGB color space. The plurality of numerical value sets enables the display of images for viewing on display interface 102, as well as the compression and reconstruction of an image.

In Step 320, in response to the CPU 104 executing the conversion function 116a, the received input image information is converted into intrinsic color information. A Karhunen-Loeve ("KL") transform generates the intrinsic color information. The KL transform (or "principal component transform") is a mathematical way of determining that linear transformation of a sample of points in N-dimensional space which exhibits the properties of the sample most clearly along the coordinate axes. Along the new axes the sample variances are extremes (maxima and minima), and uncorrelated. The name "principal component transform" comes from the principal axes of an ellipsoid (e.g. the ellipsoid of inertia), which are just the coordinate axes in question.

Intrinsic color information expresses image pixel information such that the most information about an image is presented in the first component of a color triple or quadruple, where the intrinsic color information includes a plurality of value sets for the designated image. The plurality of value sets represents the designated image in a principal components space signal format. The principal components space signal format is based on, and defined by the color image's intrinsic color distribution. The details for converting the received color image information into intrinsic color information Step 320 using the KL transformation will be described more fully below in the discussion of FIG. 4.

In Step 330, CPU 104, under the instruction of transformation function 1116b, performs an approximation of the values in the plurality of intrinsic value sets in response to receiving the intrinsic color information generated in Step 310. Transformation function 116b applies trigonometric functions to the intrinsic color information, in accordance with the JPEG DCT compression standard, or algebraic functions to the intrinsic color information, in accordance with the JPEG 2000 DWT compression standard, to generate a plurality of approximation values.

The JPEG DCT is a relative of the Fourier transform and likewise gives a frequency map, where the DCT itself is reversible except for round-off error. The motivation for generating a frequency maps is that you can now throw away high-frequency information without impacting low-frequency information. The techniques and methods for implementing the JPEG DCT are well known in the art.

To perform the JPEG 2000 DWT, the present invention uses a one-dimensional sub-band decomposition of a one-dimensional set of samples into low-pass coefficients, representing a downsampled low-resolution version of the original set, and high-pass coefficients, representing a downsampled residual version of the original set, needed to reconstruct the original set from the low-pass set.

The image is divided into tiles, or rectangular arrays that include the same relative portion of all the components that make up the image, creating tile components that can be decoded independently of each other. The tile components are decomposed into different decomposition levels using the wavelet transform. These decomposition levels contain a number of sub-bands populated with coefficients that describe the horizontal and vertical spatial frequency characteristics of the original tile-component planes. The coefficients provide frequency information about a local area, rather than across the entire image like the Fourier Transform. Specifically, a small number of coefficients completely describes a single sample. A decomposition level is related to the next decomposition level by spatial powers of two, so each successive decomposition level of the sub-bands has approximately half the horizontal and half the vertical resolution of the previous decomposition level. Images of lower resolution than the original are generated by decoding a selected subset of these sub-bands. The techniques and methods for implementing the JPEG 2000 DWT are also well known in the art.

Although the transformation function is described herein as utilizing the JPEG 2000 DWT, it is to be understood that other DWT algorithms may also be used instead of the JPEG 2000 DWT. As an example, the present invention contemplates the use of any transformation that iteratively transforms one signal into two or more filtered and decimated signals corresponding to different frequency bands.

Figure 10:
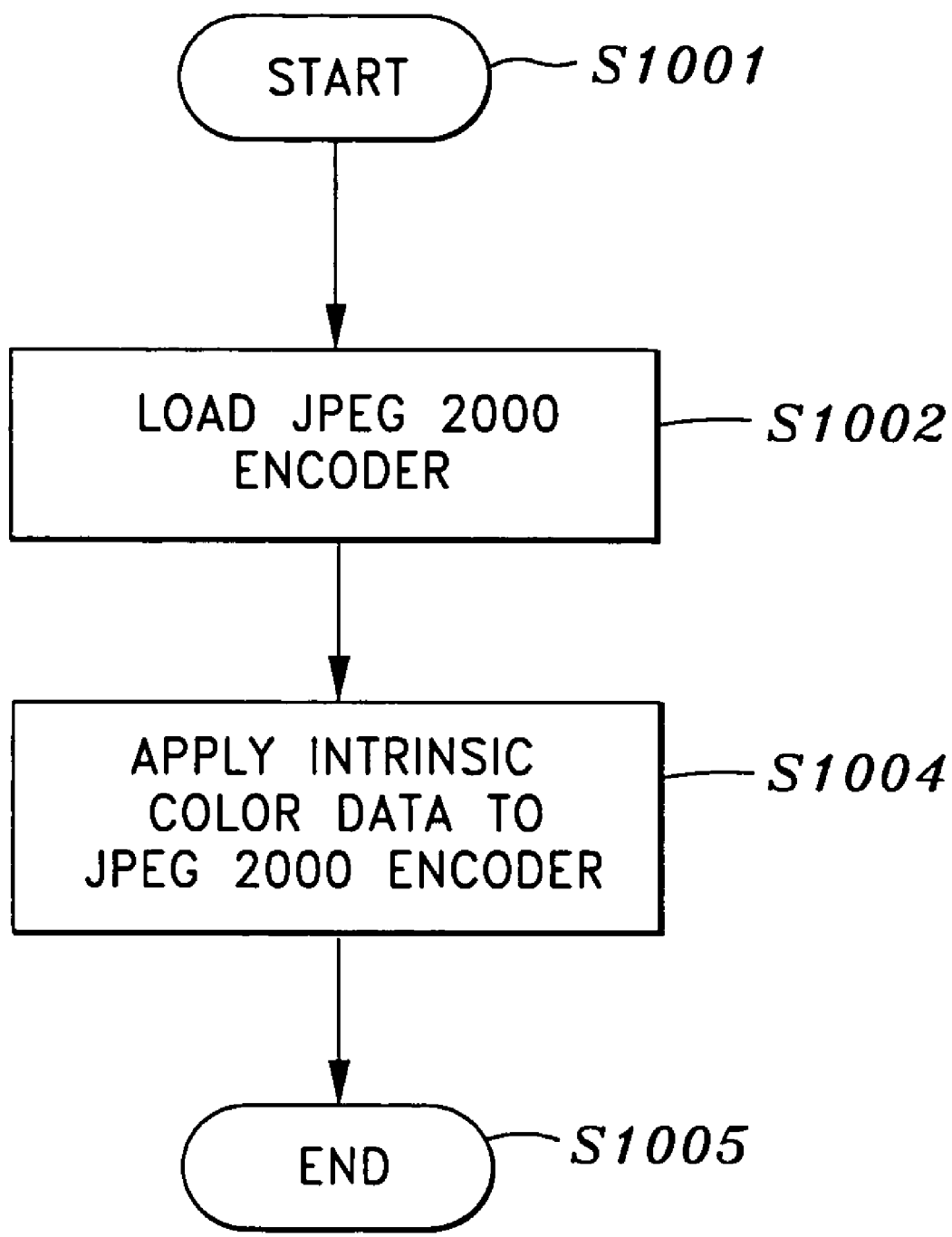
FIG. 10 is a flow diagram of the transformation function for JPEG 2000 DWT encoding according to one embodiment of the present invention.

FIG. 10 is a flow diagram of the transformation function for JPEG 2000 images according to one embodiment of the present invention. Specifically, FIG. 10 further illustrates the process for transforming intrinsic color information into transformed information using a JPEG 2000 DWT algorithm. The process begins (Step S1001), and a JPEG 2000 encoder is loaded from a data storage medium such as hard drive 106 into memory 108 (Step S1002). The intrinsic color data, which was converted from color image information in Step 320 by conversion function 116a, is applied to the JPEG 2000 encoder (Step S1004), and the JPEG 2000 encoder converts the intrinsic color data to transformed information, and the process ends (Step S1005). The DWT itself performs no data compression.

The present invention transforms image data in RGB, CMY or CMYK to principal components color space, using image specific color transformations. Conventional JPEG 2000, like conventional JPEG, currently uses a fixed color transformation in encoding an image. According to the present invention, a covariance matrix is produced for individual frames and is used to produce an eigenspace transformation that better allocates color information into the color components used in the JPEG or JPEG 2000 compression process. A principal components approach ensures that the Y channel contains the maximum allowable image entropy, since the Y channel of a YCC color space conventionally contains luminance information. This results in better quality image transmission and reduced file size for a compressed image, as an effect of JPEG 2000 compression.

Returning to FIG. 3, in Step 340, CPU 104, under the instruction of quantizer function 116c, performs the quantization process in response to receiving the plurality of approximation values in Step 330. The quantization process reduces or truncates the plurality of approximation values to a predetermined range of integer values, and thus, reduces the number of bits that are required to represent the approximation values. Quantization is performed by dividing each approximation value by a predetermined value. Generally, the predetermined value is obtained from an entry in a quantization table. It will be readily apparent to one having ordinary skill in the art that the entries in the quantization table may vary to optimize operation with a particular type of image data.

In Step 350, the CPU 104, under the instruction of encoding function 116d, performs the encoding process in response to receiving the plurality of quantized approximation values in Step 340. The encoding process reduces the number of bits that are used to represent the quantized approximation values. The reduction can be accomplished using Huffman coding, although in alternate arrangements other encoding techniques are used. The coding replaces subsets of bit information corresponding to quantized approximation values with bit information that more efficiently represents the subsets of bit information. The encoding process generates a reduced stream of bits which compactly represents the quantized approximation values in a non-redundant manner. The reduced bit stream generated by the encoding process corresponds to a compressed representation of the color image. The techniques and methods for encoding information are well known in the art.

In Step 360, the reduced bit stream corresponding to the color image is stored as a file, and the process ends (Step 370). In one embodiment, the file can be stored in memory of computer system 100. In an alternative embodiment, the file can be transmitted to remote computer 900 at remote location using network interface 112 and stored in memory 902. A user may access the file from memory at a future time for transmission and decompression. The resultant file has dramatic size and image quality improvements over conventional methods. In addition, compression-specific non-pixel information generated by the conversion routine 116a is stored and/or transmitted in association with the reduced bit stream data and represents the quantized approximation values to enable the reconstruction of the color image.

The non-pixel data includes the mean vector, the eigenmatrix and scale factors for the particular image. The non-pixel information is used to restore the color image to near original form during reconstruction. In the preferred embodiment, compression-specific non-pixel information is provided inside JPEG or JPEG 2000 application-specific markers or tags, and stored in the file as ASCII or binary data. In an alternative embodiment, the bit stream may be transmitted to a computer 900 at a remote location using a network interface 112 and stored in memory 902. One having ordinary skill in the art would recognize and appreciate such transmission modalities include but are not limited to modems and wireless devices. The compression-specific non-pixel information is transmitted with the bit stream using markers or tags, and ultimately used by the remote system to reconstruct each compressed image.

The image compression mechanism according to the present invention optimizes channel usage, resulting in less degradation in image quality while allowing greater compression ratios over conventional, fixed transformation techniques. Moreover, the present invention is particularly relevant to JPEG 2000 and other wavelet-based compression techniques, since the range of compression ratios is extended, while maintaining image quality at compression ratios approaching 100:1.

Figure 4:
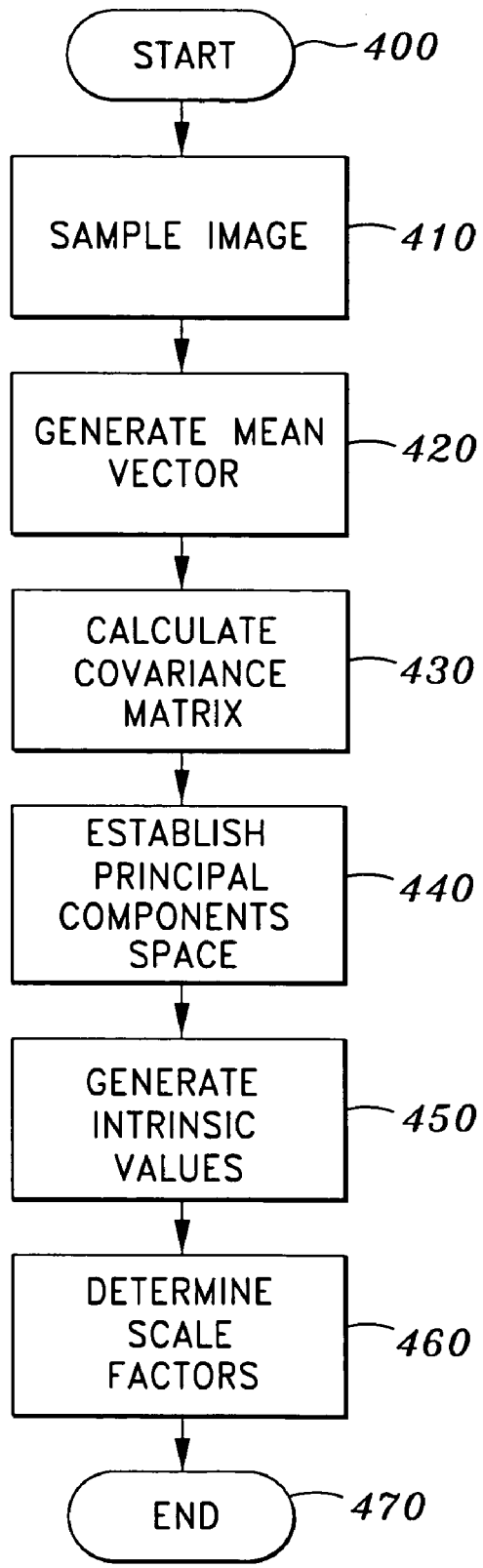
FIG. 4 is a flow diagram of the conversion function implemented by the method of the present invention.

FIG. 4 illustrates a block diagram of the conversion function 116a of the present invention, which was discussed generally in FIG. 3, above. The conversion function implements a KL color transformation to generate intrinsic color information that is specific and unique to an individual color image. The KL transform uses a color image's color statistics and color distribution to compute and establish a principal components space having a coordinate system particular to the image. The axes of the principal components space are defined by the color distribution of the image, and thus vary from image to image.

In Step 400, the KL transform begins. In Step 410, input color information, obtained in Step 310, is received to generate the mean vector for the color image. The mean vector consists of three floating-point numbers and is represented by the formula $m=(m_R m_G m_B)^T$. Each floating-point number of the mean vector corresponds to the average value of the respective color component, as designated by the subscript, of sampled pixels. For example, the floating-point number $m_R$ will be the average of the red color component values for the sampled pixels. In the preferred embodiment, the process samples every eighth pixel across in a row and down in a column starting from the upper left corner pixel to obtain a sufficient statistical sampling, customarily considered to be greater than two thousand pixels. One having ordinary skill in the art will recognize that the sampling frequency and sampling set size can be modified without departing from the scope and spirit of the invention claimed herein.

Figure 5:
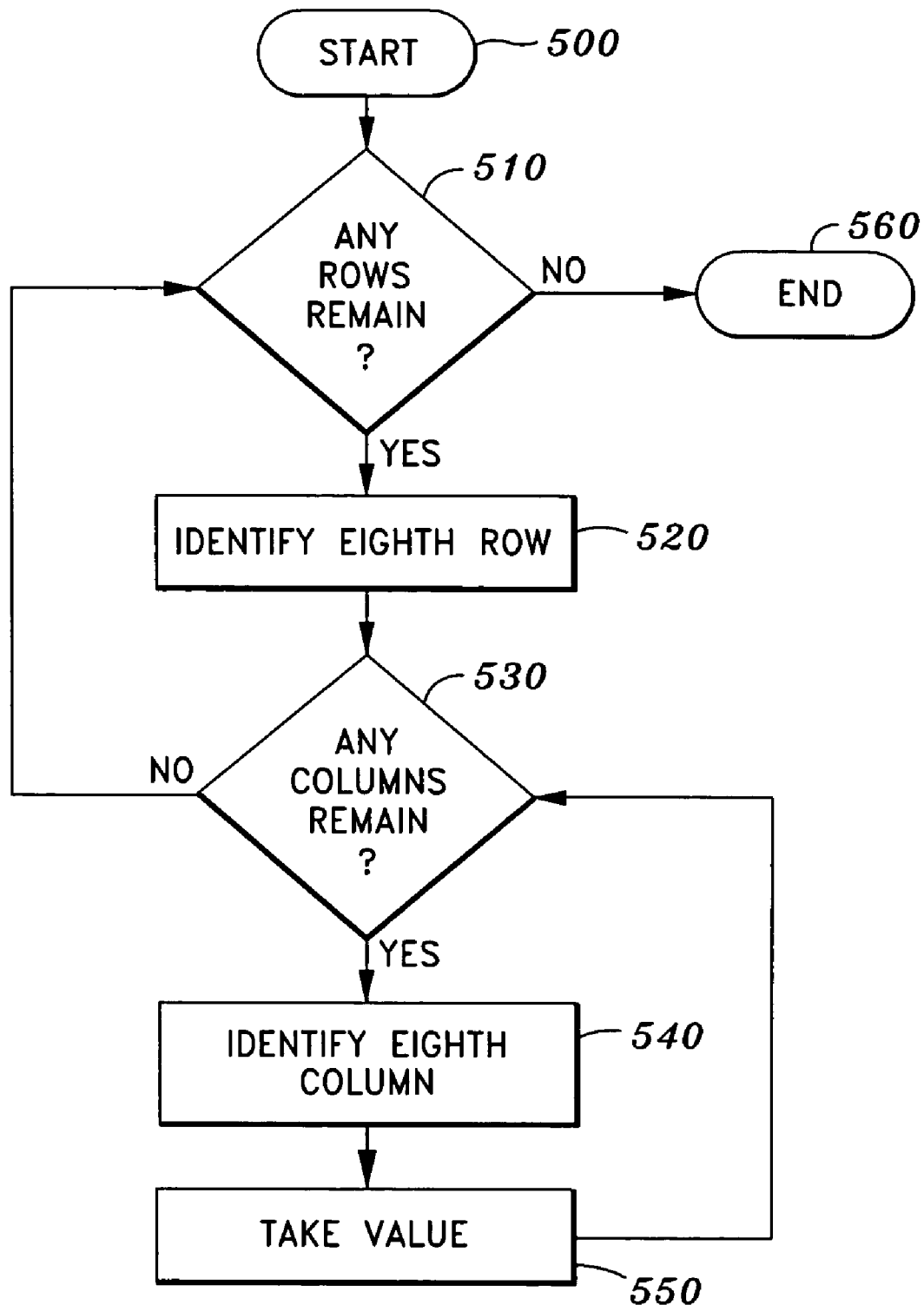
FIG. 5 is a flow diagram of the sampling algorithm performed for generating the mean vector of a color image.

Referring briefly to FIG. 5, the sampling algorithm performed in Step 410 is provided in a flowchart. In Step 500, the process starts by locating the pixel in the upper left corner of the color image. In Step 510, the process determines whether there are any remaining rows of pixels in the image to be sampled. If there are rows in the image to be sampled, the process proceeds to Step 520 where the sampling process identifies an eighth row of pixels in the image. If there are no rows to be sampled in image, the process jumps to Step 560. In Step 530, the process determines whether there are any remaining columns in the row of pixels to be sampled. If there are columns in the row of pixels to be sampled, the process proceeds to Step 540 where the sampling process identifies an eighth column in the row. If there are no columns to be sampled in the row, the process returns to Step 510. In Step 550, each value in the numerical value set for the pixel having the position corresponding to the identified row and column is taken and stored for subsequent statistical processing. In Step 560, the sampling process terminates.

Returning again to FIG. 4, in Step 420 all the numerical values taken for a respective color component from sampled pixels are added together to calculate a total component value for the respective color component. For example, all the red color component values from the sample pixels are added to produce a red component total value. The green and blue components total values are generated in a like manner. Once calculated, each of the color component totals are divided by the number of pixels sampled producing the mean vector of the image. The generated mean vector is stored for later use as non-pixel data.

Figures 6, 7:
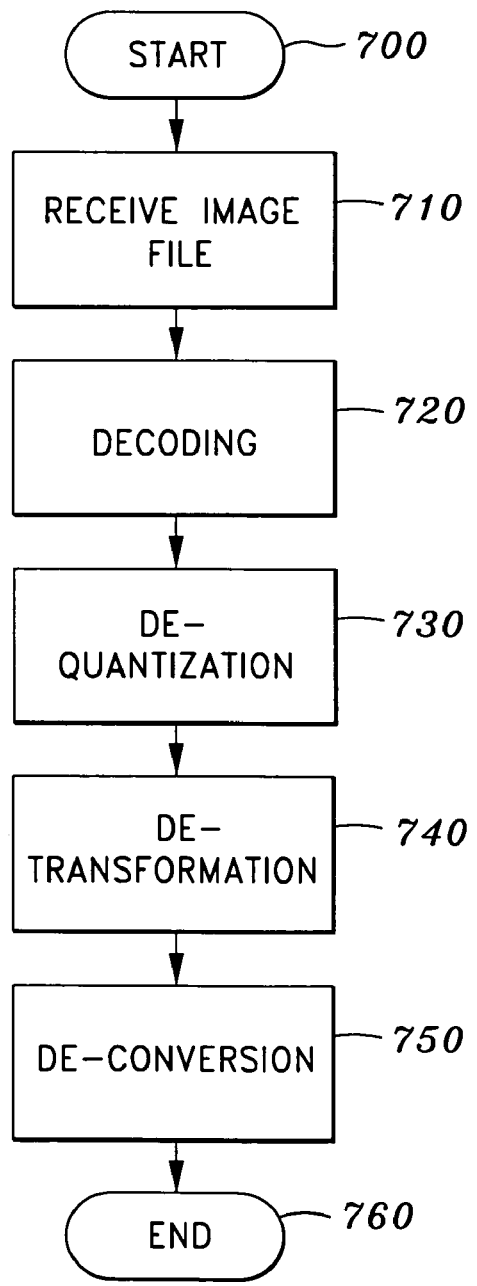
FIG. 6 is an illustration of the covariance matrix generated by the conversion function.
FIG. 7 is a block diagram of the process for reconstructing a color image, depicted as a block diagram.

In Step 430, a covariance matrix is computed using the mean vector generated in Step 410, where the covariance matrix is a 3×3 floating point matrix, computed by the formula $C=E[(p-m)(p-m)^T]$, where p represents the numerical value set of a pixel in the color image, m represents the mean vector, and E represents the expected value of the original image. The covariance matrix is generated for the sampled points by subtracting each floating-point number of the mean vector from its corresponding color component value in the numerical value set of a sampled pixel. The 3×3 covariance matrix C is illustrated in FIG. 6 with equations shown for obtaining each entry from the native RGB color triples.

Returning again to FIG. 4, in Step 440 the statistical color distribution of the obtained and designated color image is used to establish a principal components space. The principal components space is a coordinate system that uses the mean vector as the center of the system. As the center of the principal components space, the mean vector reduces the elimination of color information that has a high concentration in the image. The color image's statistical color distribution is considered when the eigenvalues of the covariance matrix C, and the respective eigenvectors are generated using the formula $Ct_k=e_k t_k$, where t represents an eigenvector, e represents an eigenvalue, and C represents the covariance matrix generated in Step 430. The subscript k ranges from 1 to 3. This can be accomplished using known programming packages for solving eigensystems (e.g., LINPACK, EISPACK).

The first eigenvector generated represents the first coordinate axis in principal components space. This first eigenvector passes through the center of the principal components space in a direction that explains the most color variation from the mean vector. In addition, the first value in a value set of the intrinsic color information corresponds to a coordinate on the first coordinate axis. The second eigenvector generated represents the second coordinate axis in principal components space. The second eigenvector is orthogonal to the first eigenvector and explains as much of the remaining color variance as possible. The second value in a value set of the intrinsic color information corresponds to a coordinate on the second coordinate axis. The third eigenvector generated represents the third coordinate axis in principal components space. The third principal component is orthogonal to the first and second eigenvectors and explains the remaining color variation. The third value in a value set of the intrinsic color information corresponds to a coordinate on the third coordinate axis.

The first, second and third eigenvectors are arranged into an eigenmatrix T. Eigenmatrix T is specific to the image since the eigenvectors are defined by the image's color statistics, and thus varies from image to image. Moreover, the matrix has the property that the transpose of eigenmatrix T is its own inverse. Accordingly, eigenmatrix T is used to convert a color image represented, for example, in RGB color space to principal components color space. In a like manner, the transpose of eigenmatrix T is used to convert a color image represented in principal components color space to RGB color space. The generated eigenmatrix T is stored as non-pixel data.

In Step 450, the sets of numerical values which characterize the image in a normal color space are converted into intrinsic color value sets that characterize the color image in principal components space. The conversion uses the mean vector generated in Step 420 and the eigenmatrix generated in Step 440 to generate intrinsic color values that characterize the color image in principal components space. The formula for performing the conversion is defined by $p^c=T(p-m)$, where T is the eigenmatrix, m is the mean vector and p is the numerical value set of a pixel in the image. The intrinsic color value sets in principal components space are generated by subtracting the mean vector values from corresponding color component values in a numerical value set and multiplying the results of the subtractions by eigenmatrix T. The intrinsic value sets are a plurality of three floating point values that correspond to the first, second and third principal component space coordinates. This conversion is performed for each numerical value set of a color image to produce a corresponding number of intrinsic color value sets.

In Step 460, scale factors are generated to enable the principal components space coordinates to be mapped into integer byte values. The scale factors include scale and offset values, in the form of floating point numbers, for each axis in principal components space. To compute the scale and offset values, the minimum and maximum principal components space coordinates for each principal components space axis must be identified. Upon identifying the minimum and maximum principal space coordinates, scale and offset values are determined to map principal components space coordinates from the range [min . . . max] into the range [0 . . . 255], where [0 . . . 255] is the range of values an unsigned byte quantity can assume. The offset values correspond to the minimum coordinate values associated with each principal coordinate axis. Accordingly, the minimum coordinate value on each axis is selected as the offset for the axis. The scale values correspond to the maximum coordinate values subtracted from the minimum coordinate values for each principal coordinate axis divided by 255. The scale and offset values are stored for later use as non-pixel data. In Step 470, the process terminates. Upon completion, the plurality of intrinsic value sets of the intrinsic color information is provided to the transformation function 116b described above for approximation and quantization using DCT or DWT.

FIG. 7 is a block diagram depicting the process for reconstructing a color image. The reconstruction can be performed on any computer system 100 or 900 having the reconstruction program stored therein. Briefly, the present invention is a method for reconstructing a color image. The method includes the steps of receiving encoded information for the color image, decoding the encoded information into quantized information, and de-quantizing the quantized information into transformed information. The method further includes the steps of de-transforming the transformed information into intrinsic color information, using an inverse of a discrete wavelet transform algorithm, and de-converting the intrinsic color information into color image information.

In more detail, the reconstruction process begins (Step 700), and in Step 710 a file is received including information corresponding to an image, compressed using the technique described in FIG. 3 through FIG. 6. Accordingly, the information provided in the file is reduced image information and non-pixel data. In Step 720, the CPU 104, under the instruction of decoder function 118d, performs an inverse encoding process. The inverse encoding process replaces the reduced image information, which is a stream of bits that compactly represents the image in a non-redundant manner, with a bit stream that originally represented the color image. More specifically, the bit stream that originally represented the quantized approximation values is generated. The techniques and methods for decoding information are well known in the art.

In Step 730, the CPU 104, under the instruction of dequantization function 118c, performs an inverse quantization process in response to receiving the bit stream that originally represented the quantized approximation values. The dequantization process returns the plurality of quantized approximation values to there near original range of approximation values. As in the quantization Step 340 above, the process is achieved using a quantization table.

In Step 740, the CPU 104, under the instruction of the transformation function 1118b, performs an inverse approximation of the original approximation values. The process generates a plurality of value sets that are substantially similar to the original plurality of intrinsic value sets. The transformation function 118b applies the inverse of the JPEG DCT or JPEG 2000 DWT to generate the plurality of value sets that are substantially similar to the original plurality of intrinsic value sets. The techniques and methods for implementing the inverse JPEG DCT or JPEG 2000 DWT are well known in the art. Specifically, in order to implement an inverse JPEG 2000 DWT, the present invention uses a one-dimensional sub-band recomposition of a one-dimensional set of samples from low-pass and high-pass coefficient.

In Step 750, the substantially similar plurality of intrinsic value sets are converted back to numerical value sets that characterize the color image in normal color space. The conversion of the intrinsic value sets to numerical value sets is accomplished using the non-pixel data. The process converts the values of the intrinsic value sets from floating point numbers to unsigned byte numbers.

In Step 760 the process ends. Information corresponding to the numerical values sets are transmitted to the output buffer 124 for display on display interface 102.

Figure 8:
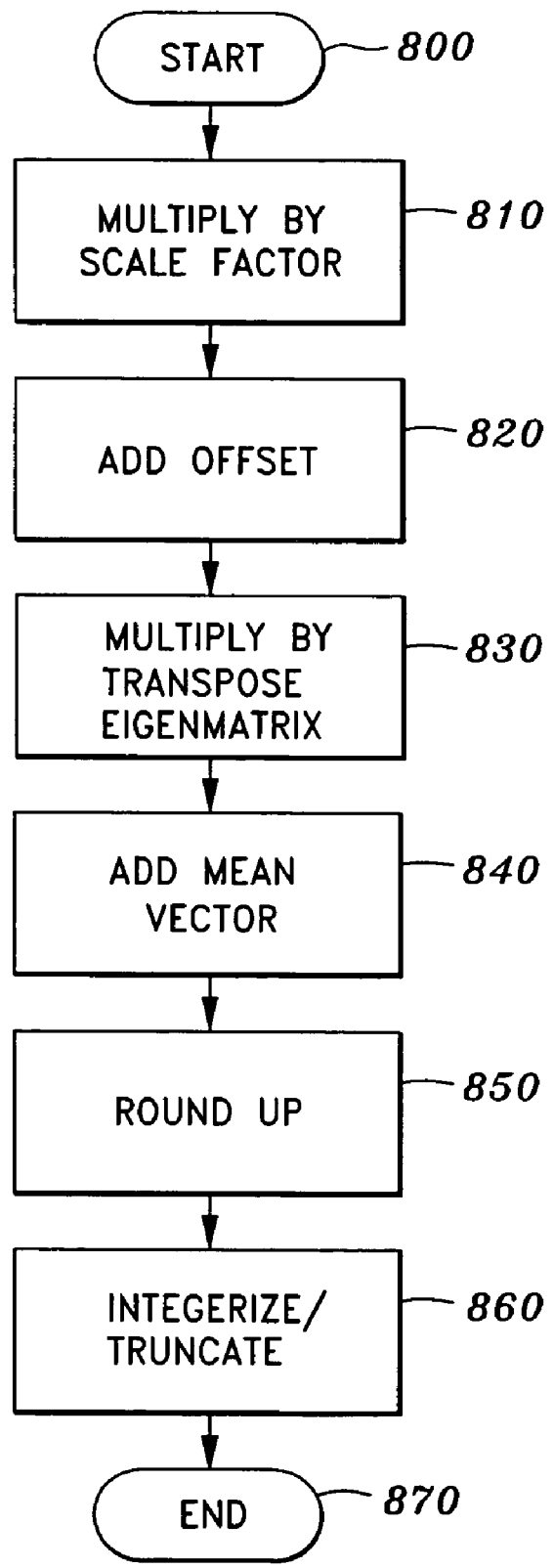
FIG. 8 is a flow diagram for the method of converting the plurality of intrinsic value sets to numerical value sets.

The method of converting the plurality of intrinsic value sets to numerical value sets is depicted in FIG. 8. In Step 800 the process begins, and in Step 810 each principal coordinate value in an intrinsic value set is multiplied by its corresponding scale factor. This step is repeated for each intrinsic value set that is in the plurality of intrinsic value sets. In Step 820, each principal coordinate value in an intrinsic value set is added to its corresponding offset. Like Step 810, this step is repeated for each intrinsic value set that is in the plurality of intrinsic value sets. In Step 830, each intrinsic value set in the plurality of intrinsic value sets is multiplied by the transpose of the eigenmatrix T. In Step 840, the mean vector is added to each intrinsic value in the plurality of intrinsic value sets. In Step 850, a value of 0.5 is added to each intrinsic value in the plurality of intrinsic value sets. In Step 860, each intrinsic value in the plurality of intrinsic value sets is truncated to a whole value. In addition, intrinsic values that are less than zero are made equal to zero and intrinsic values that are greater than 255 are made equal to 255. The process terminates in Step 870.

Figure 9:
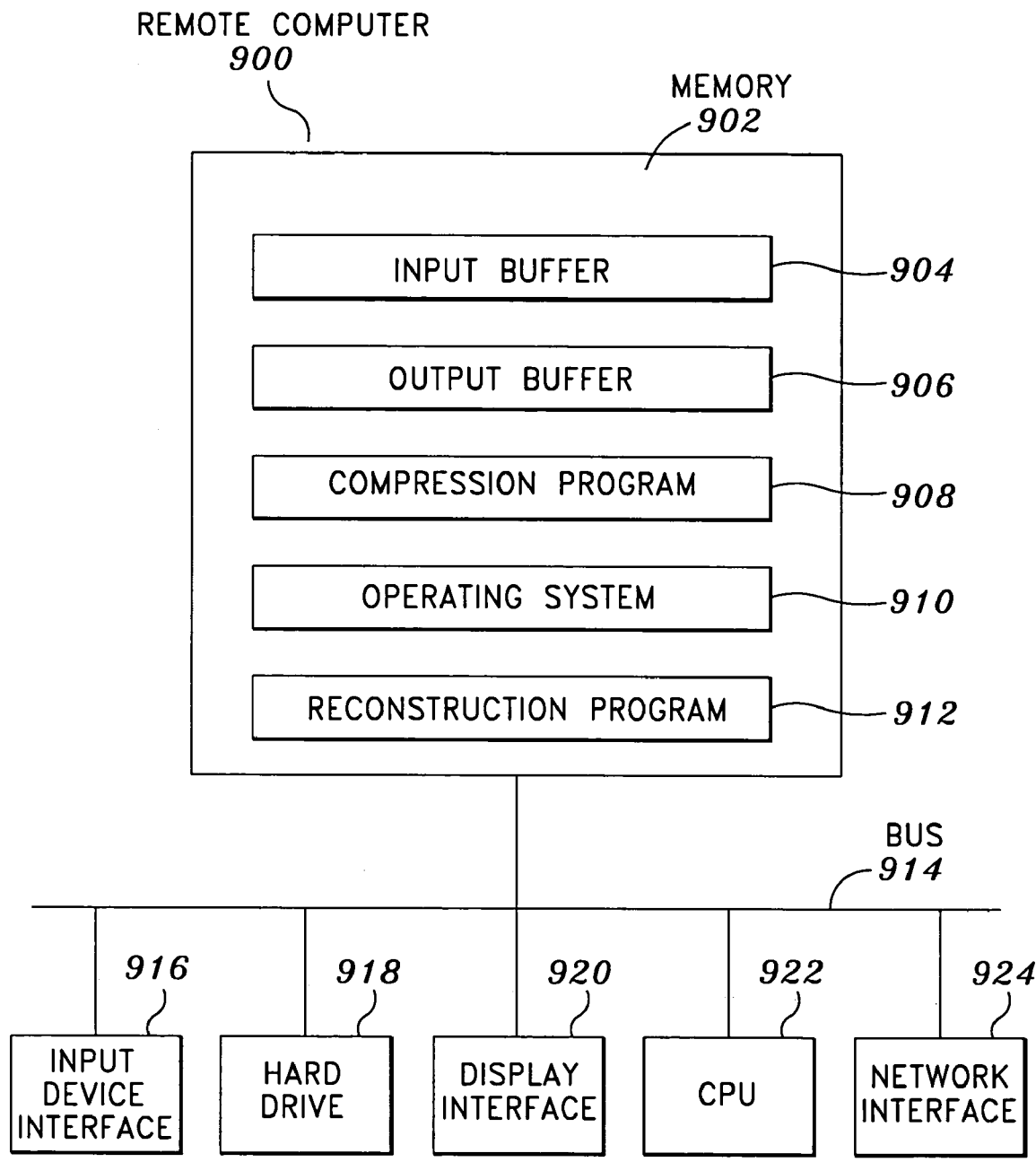
FIG. 9 is a functional block diagram of a remote computer in which the invention of the present invention can be carried out.

FIG. 9 simply represents a remote computer 900 in which the present invention can also be practiced. Remote computer 900 is similar to computer system 100 of FIG. 1, and the similar components are therefore not described again for the sake of brevity. The difference between remote computer 900 and computer system 100 is that memory 902 of remote computer 900 includes input buffer 904 instead of data files. In this manner, remote computer 900 receives data files, such as an image, from a remote source Although specific embodiments of the present invention have been described, it will be understood by those skilled in the art that there are other embodiments that are equivalent to the described embodiments. Accordingly it is to be understood that the invention is not to be limited by the specific illustrated embodiments, but only by the scope of the appended claims.

What is claimed is:

1. A method for compressing a color image, comprising the steps of:
   receiving color image information for the color image;
   converting the color image information into intrinsic color information;
   transforming the intrinsic color information into transformed information using a discrete wavelet transform algorithm;
   quantizing the transformed information into quantized information;
   encoding the quantized information into encoded information; and
   storing the encoded information.

2. The method for compressing a color image according to claim 1, wherein the discrete wavelet transform algorithm is a JPEG 2000 discrete wavelet transform algorithm.

3. The method for compressing a color image according to claim 1, wherein the intrinsic color information represents the color image in a principal components space.

4. The method for compressing a color image according to claim 1, further comprising the step of generating non-pixel data associated with the color image.

5. The method for compressing a color image according to claim 4, wherein said non-pixel data includes an eigenmatrix, scale factors, and a mean vector.

6. The method for compressing a color image according to claim 4, further comprising the step of storing the non-pixel data in association with the encoded information.

7. A system for compressing a color image, comprising:
   means for receiving color image information for the color image;
   means for converting the color image information into intrinsic color information;
   means for transforming the intrinsic color information into transformed information using a discrete wavelet transform algorithm;
   means for quantizing the transformed information into quantized information;
   means for encoding the quantized information into encoded information; and
   means for storing the encoded information.

8. The system for compressing a color image according to claim 7, wherein the discrete wavelet transform algorithm is a JPEG 2000 discrete wavelet transform algorithm.

9. The system for compressing a color image according to claim 7, wherein the intrinsic color information represents the color image in a principal components space.

10. The system for compressing a color image according to claim 7, further comprising means for generating non-pixel data associated with the color image.

11. The system for compressing a color image according to claim 10, wherein the non-pixel data includes an eigenmatrix, scale factors, and a mean vector.

12. The system for compressing a color image according to claim 10, further comprising means for storing the non-pixel data in association with the encoded information.

13. A computer-readable storage medium in which is stored a program for compressing a color image, said program comprising codes for permitting a computer to perform:
   a reception step for receiving color image information for the color image;
   a converting step for converting the color image information into intrinsic color information;
   a transforming step for transforming the intrinsic color information into transformed information using a discrete wavelet transform algorithm;
   a quantizing step for quantizing the transformed information into quantized information;
   an encoding step for encoding the quantized information into encoded information; and
   a storing step for storing the encoded information.

14. The computer-readable storage medium according to claim 13, wherein the discrete wavelet transform algorithm is a JPEG 2000 discrete wavelet transform algorithm.

15. The computer-readable storage medium according to claim 13, wherein the intrinsic color information represents the color image in a principal components space.

16. The computer-readable storage medium according to claim 13, wherein said program further comprises codes for permitting the computer to perform a generating step for generating non-pixel data associated with the color image.

17. The computer-readable storage medium according to claim 16, wherein the non-pixel data includes an eigenmatrix, scale factors, and a mean vector.

18. The computer-readable storage medium according to claim 16, wherein said program further comprises codes for permitting the computer to perform a storing step for storing the non-pixel data in association with the encoded information.

19. A method for compressing and reconstructing a color image, comprising the steps of:
   receiving color image information for the color image;
   converting the color image information into intrinsic color information;
   transforming the intrinsic color information into transformed information using a discrete wavelet transform algorithm;
   quantizing the transformed information into quantized information;
   encoding the quantized information into encoded information; and
   reconstructing the encoded information using non-pixel data.

20. The method for compressing and reconstructing a color image according to claim 19, wherein the discrete wavelet transform algorithm is a JPEG 2000 discrete wavelet transform algorithm.

21. The method for compressing and reconstructing a color image according to claim 19, wherein the intrinsic color information represents the color image in a principal components space.

22. A method for compressing and reconstructing a color image, comprising the steps of:
   generating intrinsic color information for the color image;
   compressing the intrinsic color information using a JPEG 2000 discrete wavelet transform algorithm; and
   reconstructing the color image using non-pixel data.

23. A method for reconstructing a color image, comprising the steps of:
   receiving encoded information for the color image;
   decoding the encoded information into quantized information;
   de-quantizing the quantized information into transformed information;
   de-transforming the transformed information into intrinsic color information, using an inverse of a discrete wavelet transform algorithm; and
   de-converting the intrinsic color information into color image information.

24. The method for reconstructing a color image according to claim 23, wherein the discrete wavelet transform algorithm is a JPEG 2000 discrete wavelet transform algorithm.

25. The method for reconstructing a color image according to claim 23, wherein the intrinsic color information represents the color image in a principal components space.

26. The method for reconstructing a color image according to claim 23, further comprising the step of retrieving non-pixel data associated with the color image.

27. The method for reconstructing a color image according to claim 26, wherein said non-pixel data includes an eigenmatrix, scale factors, and a mean vector.

28. The method for reconstructing a color image according to claim 26, wherein the intrinsic color information is de-converted using the non-pixel data.

29. A system for reconstructing a color image, comprising:
   means for receiving encoded information for the color image;
   means for decoding the encoded information into quantized information;
   means for de-quantizing the quantized information into transformed information;
   means for de-transforming the transformed information into intrinsic color information, using an inverse of a discrete wavelet transform algorithm; and
   means for de-converting the intrinsic color information into color image information.

30. The system for reconstructing a color image according to claim 29, wherein the discrete wavelet transform algorithm is a JPEG 2000 discrete wavelet transform algorithm.

31. The system for reconstructing a color image according to claim 29, wherein the intrinsic color information represents the color image in a principal components space.

32. The system for reconstructing a color image according to claim 29, further comprising means for retrieving non-pixel data associated with the color image.

33. The system for reconstructing a color image according to claim 32, wherein the non-pixel data includes an eigenmatrix, scale factors, and a mean vector.

34. The system for reconstructing a color image according to claim 32, wherein the intrinsic color information is de-converted using the non-pixel data.

35. A computer-readable storage medium in which is stored a program for reconstructing a color image, said program comprising codes for permitting a computer to perform:
   a reception step for receiving encoded information for the color image;
   a decoding step for decoding the encoded information into quantized information;
   a de-quantizing step for de-quantizing the quantized information into transformed information;
   a de-transforming step for de-transforming the transformed information into intrinsic color information, using an inverse of a discrete wavelet transform algorithm; and
   a de-converting step for de-converting the intrinsic color information into color image information.

36. The computer-readable storage medium according to claim 35, wherein the discrete wavelet transform algorithm is a JPEG 2000 discrete wavelet transform algorithm.

37. The computer-readable storage medium according to claim 35, wherein the intrinsic color information represents the color image in a principal components space.

38. The computer-readable storage medium according to claim 35, wherein said program further comprises codes for permitting the computer to perform a retrieving step for retrieving non-pixel data associated with the color image.

39. The computer-readable storage medium according to claim 38, wherein the non-pixel data includes an eigenmatrix, scale factors, and a mean vector.

40. The computer-readable storage medium according to claim 38, wherein the intrinsic color information is de-converted using the non-pixel data.

* * * * *